Aug. 27, 1957 J. D. ARMSTRONG ET AL 2,804,192
AUTOMATIC FEEDING ARRANGEMENT FROM BREAD COOLER
TO BREAD SLICERS AND WRAPPERS
Filed June 14, 1952 9 Sheets-Sheet 1

INVENTORS:
John D. Armstrong
Clifford G. Wallman
Wallace W. Wittenberger
By Bair, Freeman & Molinare Attys.

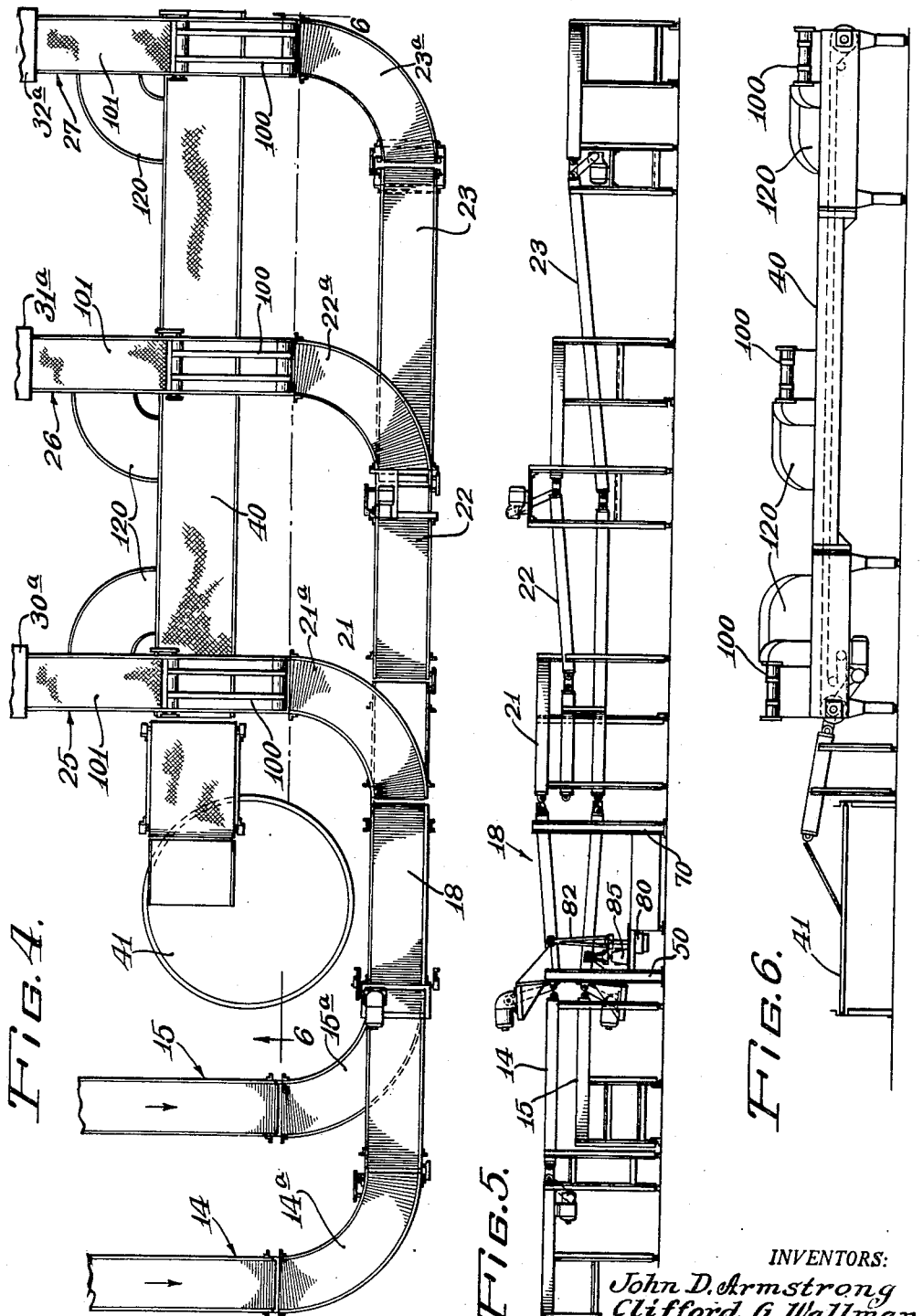

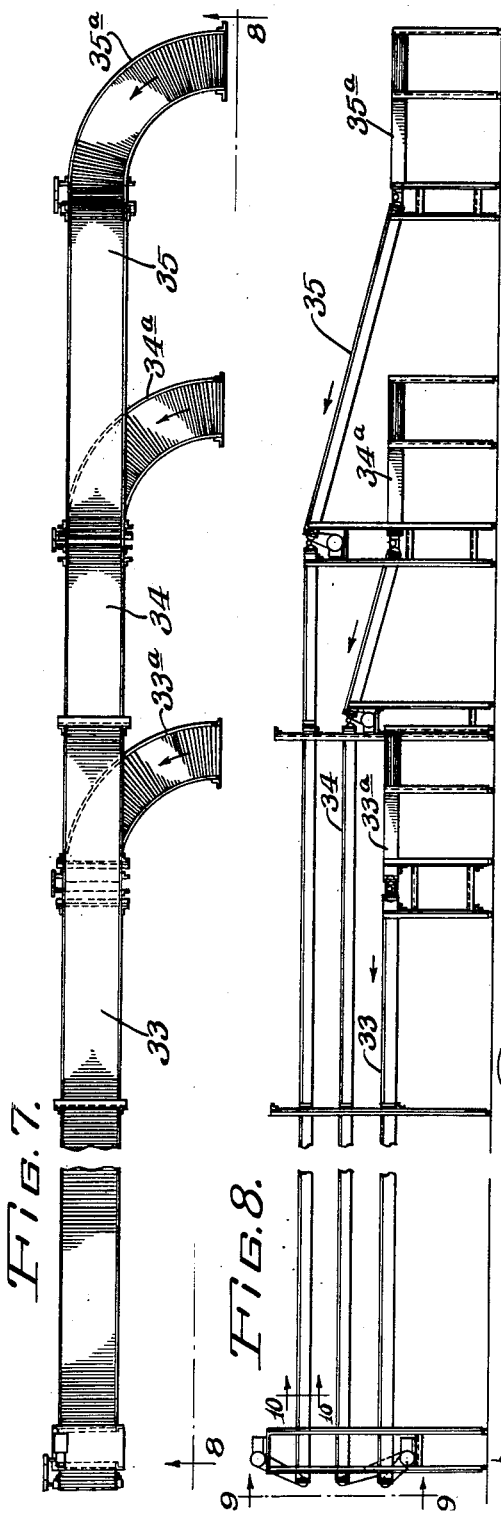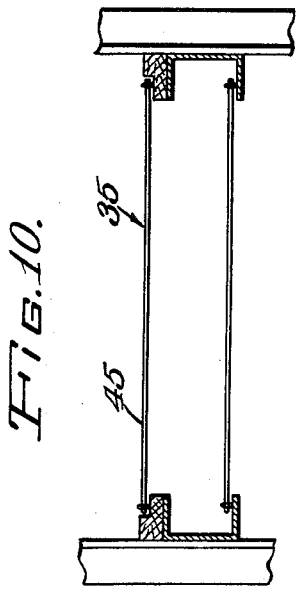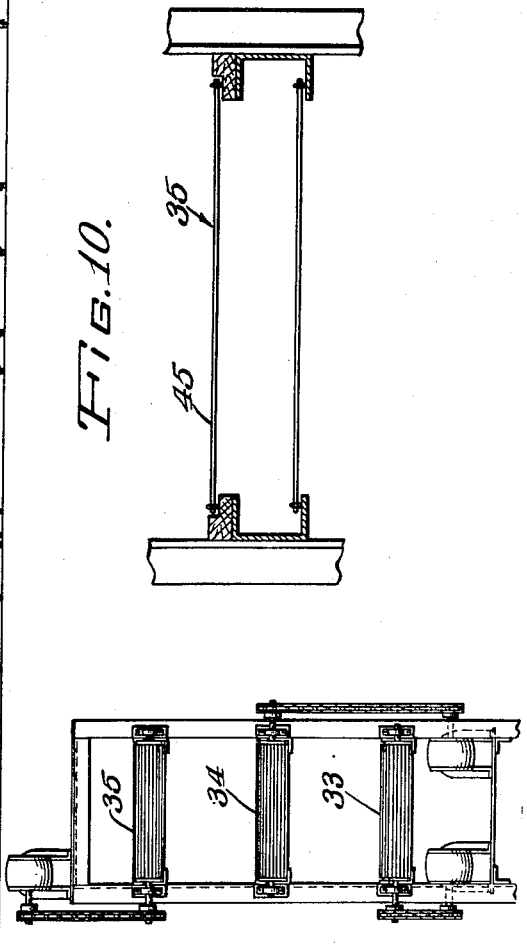

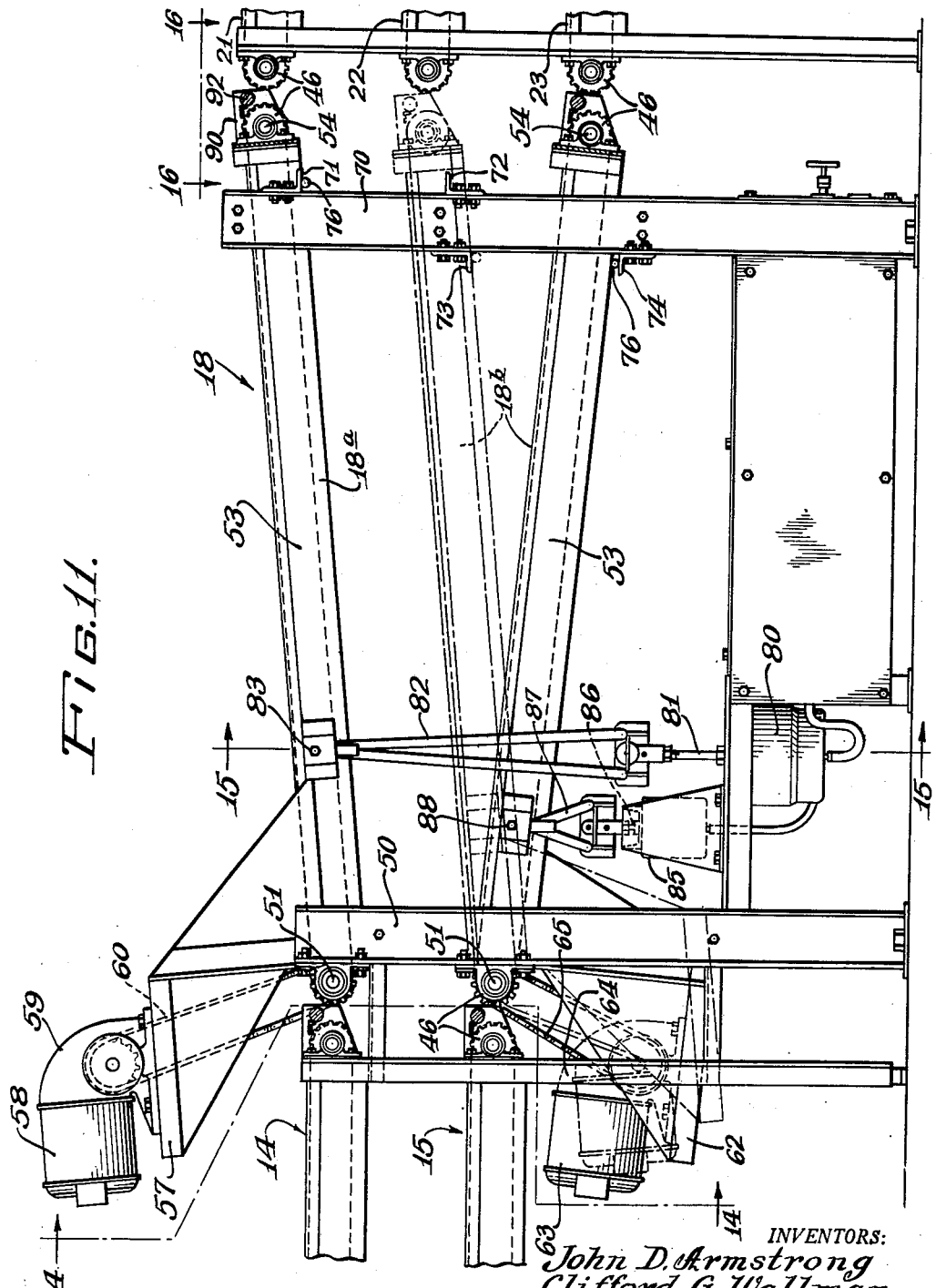

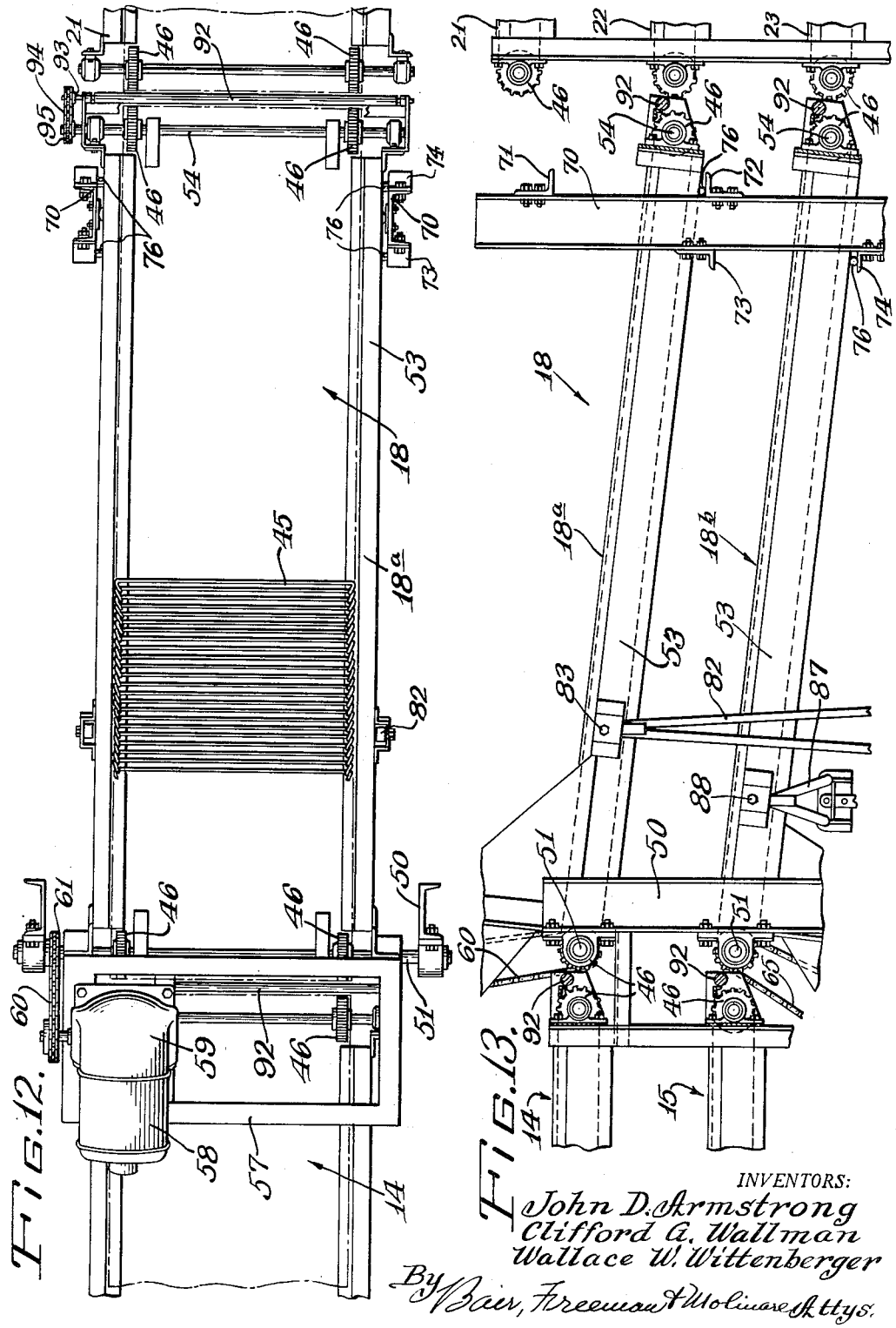

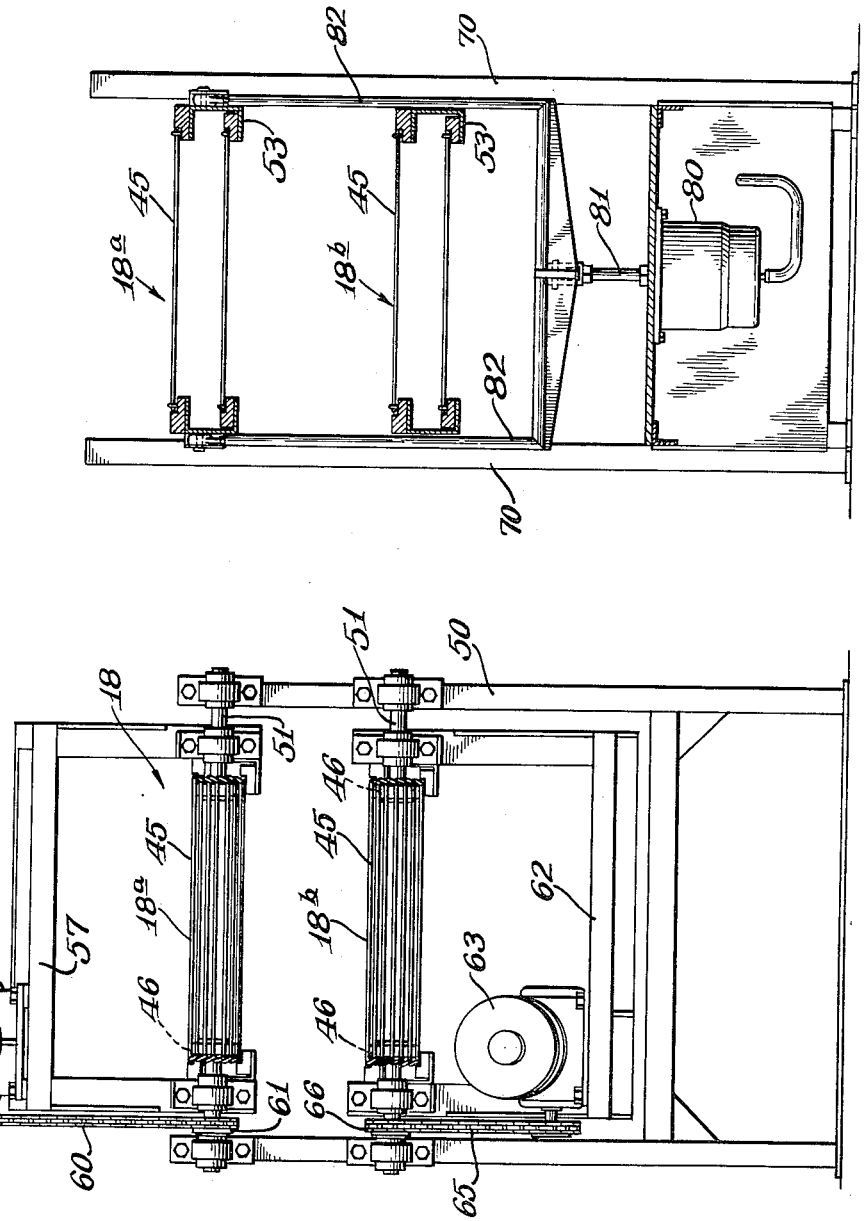

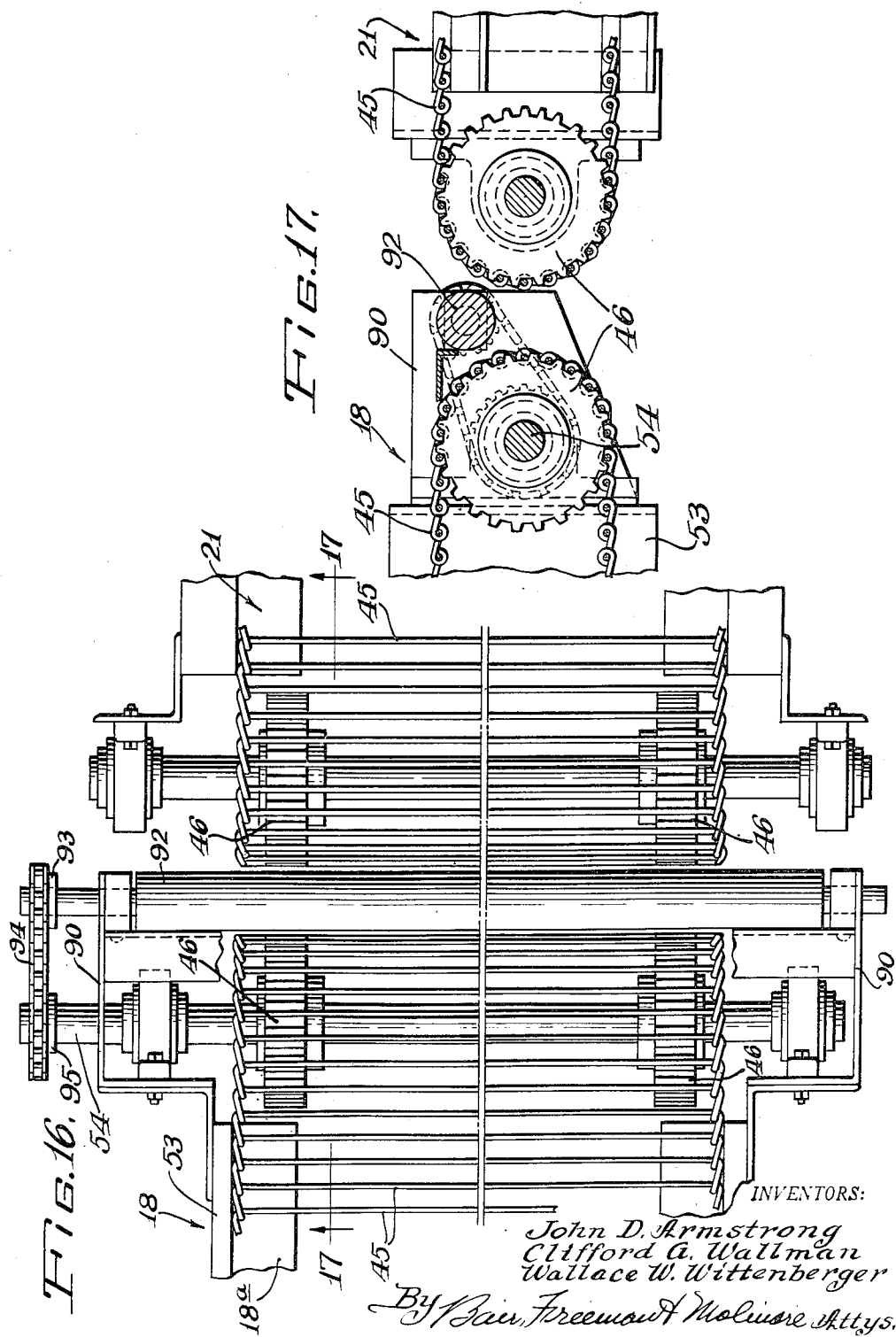

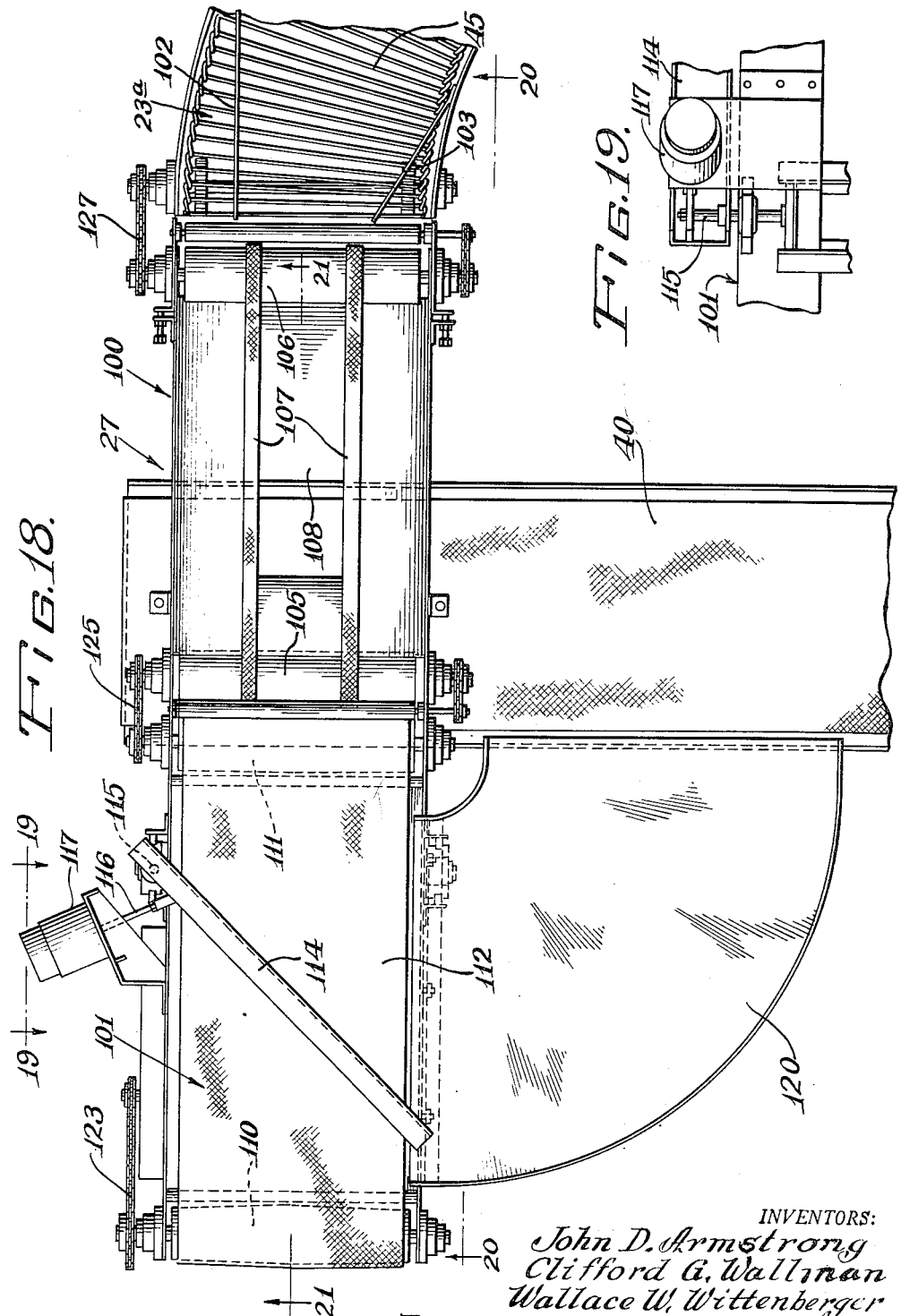

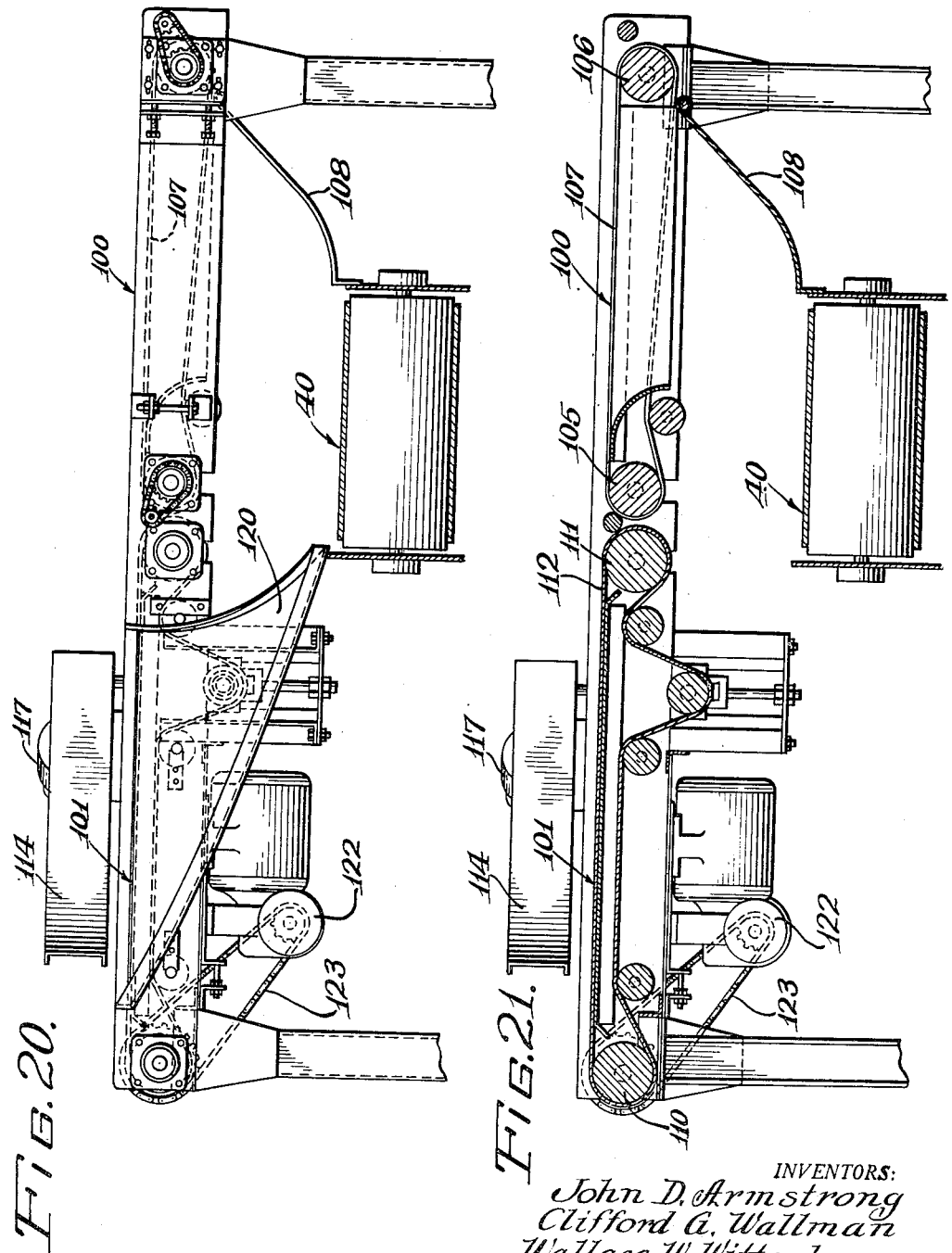

United States Patent Office 2,804,192
Patented Aug. 27, 1957

2,804,192

AUTOMATIC FEEDING ARRANGEMENT FROM BREAD COOLER TO BREAD SLICERS AND WRAPPERS

John D. Armstrong, Elmhurst, Clifford G. Wallman, La Grange, and Wallace W. Wittenberger, Elmhurst, Ill., assignors to The Petersen Oven Company, Franklin Park, Ill., a corporation of Illinois Application June 14, 1952, Serial No. 293,596

5 Claims. (Cl. 198—94)

The present invention relates to a conveyor system for use in commercial bakeries and, more particularly, for mechanically handling of bread from the time it leaves the baking oven up to the time that it is delivered in sliced and wrapped condition, preparatory to loading onto delivery trucks, or placed on racks for temporary storage.

It has long been recognized as highly desirable to provide an arrangement for mechanically handling of bread from the time it is removed from the baking oven, up to the final loading of the sliced and wrapped bread onto trucks for delivery. Such an arrangement results in the elimination of numerous personnel, insures efficient operation, and provides a more compact arrangement of apparatus, as well as a reduction in floor space required for performing the necessary handling operations of the baked bread, all of which effects substantial reductions in cost of production of bread.

In order to carry out an efficient system for handling of bread, directly from the baking oven up to the loading onto delivery trucks, there must be an allowance of a substantial period of time for cooling of the bread (generally in the range of an hour to two hours), in order that the loaf of bread may be cooled to a proper slicing and wrapping temperature, prior to feeding of the bread into combination slicer-wrapper machines. It is now possible to provide a complete mechanical conveying system of the character above indicated, by reason of the employment in the conveying system of a bread cooler, through which the hot bread, from the baking oven, is caused to move on conveyors, until the temperature thereof has dropped a desired amount.

One of the objects of this invention is to provide a novel bakery conveyor system for feeding of loaves of bread mechanically from the baking oven, through combination slicer-wrapper machines, in a manner which insures high efficiency and which requires a minimum number of attendants.

Another object is to provide a novel bakery conveyor system for feeding of bread to combination slicer-wrapper machines, either under manual or automatic control, and which is constructed and arranged so as to discontinue the feeding of bread to a slicer-wrapper machine, which may have become inoperative for various reasons, and causing such feeding to be switched to a stand-by combination slicer-wrapper machine.

A further object is to provide a novel switch conveyor unit in a bakery conveyor system of the character indicated, which permits simultaneous handling of two separate streams of loaves of bread, and selectively discharging the same onto two of three take-away conveyors which feed bread to combination slicer-wrapper machines.

Still another object is to provide a novel switch conveyor unit of the character indicated, which is simple in construction, efficient in use, and which permits continuous handling of bread from a baking oven, at the capacity of said oven, at a rate of speed considerably less than the normal rate of discharge from the oven.

A still further object of this invention is to provide novel means for discharging from the conveyor system, loaves of bread which are disposed in a position so as to travel in a generally endwise direction.

And a still further object of this invention is to provide a novel deflector unit for mechanically shunting loaves of bread off of the conveyor, adjacent a combination slicer-wrapper machine, when the latter becomes inoperative.

Other objects and advantages of this invention will be apparent from the following description taken in connection with the accompanying drawings, in which:

Figure 4 is an enlarged plan view of the portion of the conveyor system leading from the bread cooler up to the bank of combination slicer-wrapper machines.

Figure 5 is a front elevational view of the portion of the conveyor system shown in Figure 4.

Figure 6 is an elevational view of an intermediate portion of the conveyor system, taken substantially as indicated at line 6—6 on Figure 4.

Figure 7 is an enlarged plan view of the terminal portion of the conveyor system, beyond the bank of combination slicer-wrapper machines.

Figure 8 is an elevational view of the conveyor system shown in Figure 7 and taken substantially as shown at line 8—8 on Figure 7.

Figure 9 is an end elevational view of the conveyor system shown in Figure 7, taken as indicated at line 9—9 on Figure 8.

Figure 10 is an enlarged, fragmentary, cross-sectional view through one of the conveyors, taken as indicated at line 10—10 on Figure 8.

Figure 11 is an enlarged side elevational view of the switch conveyor unit embodying the present invention.

Figure 12 is a plan view of the switch conveyor unit.

Figure 13 is a side elevational view of the switch conveyor unit showing the conveyor units in a different position of adjustment.

Figure 14 is an end elevational view of the switch conveyor unit, taken substantially as indicated at line 14—14 on Figure 11.

Figure 15 is a vertical sectional view through the switch conveyor unit, taken substantially as indicated on line 15—15 on Figure 11.

Figure 16 is a greatly enlarged, fragmentary, plan view of the discharge end of the switch conveyor unit and the head end of a take-away conveyor.

Figure 17 is a vertical section, taken substantially as indicated at line 17—17 on Figure 16.

Figure 18 is a plan view of a plurality of integrated conveyor units immediately adjacent one of the combination slicer-wrapper machines and showing the deflector mechanism embodying the present invention.

Figure 19 is a fragmentary, side elevational view, taken as indicated at line 19—19 on Figure 18.

Figure 20 is a view, part in elevation and part in section, of the conveyor structures, taken substantially as indicated at line 20—20 on Figure 18.

Figure 21 is a vertical sectional view, somewhat similar to Figure 20, and taken substantially as indicated at line 21—21 on Figure 18.

Figure 1:
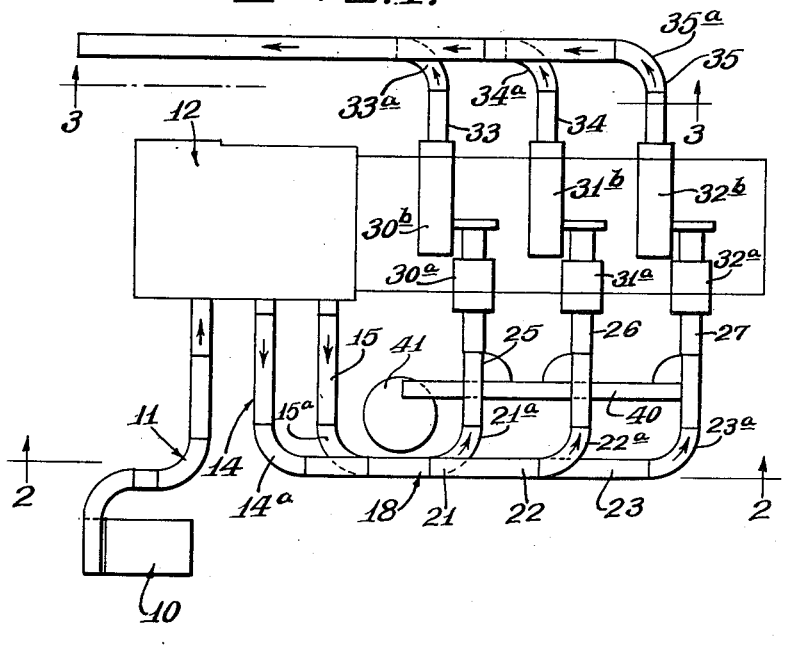
Figure 1 is a diagrammatic layout of a bakery conveyor system embodying the present invention.
Figure 2:
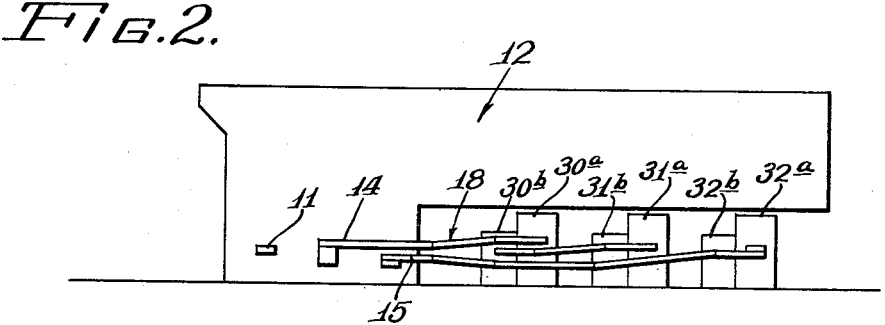
Figure 2 is a diagrammatic, elevational view, taken at line 2—2 on Figure 1.
Figure 3:
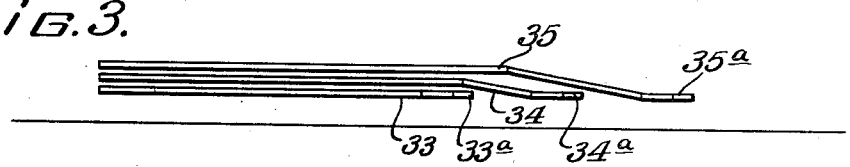
Figure 3 is a diagrammatic layout, in elevation, of the conveying system, beyond the combination slicer-wrapper machine, taken substantially as indicated at line 3—3 on Figure 1.

In a diagrammatic illustration of the novel bakery conveyor system, embodying the present invention, as represented in Figures 1 to 3 of the drawings, there is disclosed an arrangement for conveying baked bread from a mechanical bread depanning unit to the final delivery station, where the sliced and wrapped loaves of bread are removed for loading onto delivery trucks, or placed on racks for temporary storage. In Figure 1 of the drawings the reference character 10 designates a mechanical bread depanning machine which, it is to be understood, is connected by conveyors (not shown) for receiving the baked bread directly from a baking oven (not shown). As is well known, in commercial bakeries, bread is generally baked in pans which are connected together in units referred to as pan straps. Pan straps usually comprise a multiple number of pan elements, usually in the range of three to six. It is to be understood that the mechanical depanner automatically and mechanically handles the pan straps of bread in a manner to effect the discharge of bread from the respective pan units, and the bread is then deposited on a conveyor, indicated generally at 11, and the empty pan straps are deposited on a conveyor (not shown), and may be further conveyed to greasing apparatus for reuse. It is to be understood that the bread is deposited on the conveyor 11, in transverse relation, and is fed by the conveyor 11 into a bread cooler, indicated generally at 12.

As is well known, bread coolers generally comprise a conveyor structure of the tray type, of substantial width, and the loaves of bread are mechanically deposited thereon directly by the conveyor 11 until the tray contains a predetermined number of loaves. The tray conveyor of the cooler comprises a multiple number of laps or runs, and each tray of bread is caused to move through the various laps or runs of the cooler, which requires a period of time sufficient for reducing the temperature of the loaves of bread to a predetermined amount for cooling the hot loaves of bread and thereby hardening and forming the crust of the loaves. At average bakery temperatures, it requires in the general range of an hour to an hour and a half for effecting adequate cooling of the bread. In the arrangement shown, the cooler is constructed so as to discharge loaves of bread from the trays of the cooler (after completing the cooling cycle) into two outgoing streams or lines, directly onto feeding conveyors, indicated generally at 14 and 15. It is to be understood that each tray of the cooler accommodates two separate spaced apart rows of loaves of bread, which are simultaneously ejected from the tray onto the two conveyors 14 and 15.

The feed conveyors 14 and 15 both discharge the bread from the cooler onto a multiple tier switch conveyor unit, indicated generally at 18. As may be noted in Figures 5, 11 and 13 of the drawings, the discharge end portions of the conveyors 14 and 15 terminate in vertically spaced apart relation, in registration with the head ends of two, vertically spaced apart, conveyors 18a and 18b of the switch conveyor unit. As will hereinafter be described in detail, the two conveyors 18a and 18b, are adapted to be selectively adjusted vertically so that their discharge ends register with the head ends of two of the three vertically spaced apart take-away conveyors, indicated generally at 21, 22 and 23. More specifically, the conveyors of the switch conveyor unit are so arranged that the top conveyor 18a may be selectively adjusted for discharging onto either of conveyors 21 and 22, while the bottom conveyor 18b may be selectively adjusted for discharging onto either of conveyors 22 or 23. Each of the take-away conveyors 21, 22 and 23 merge respectively into transversely extending multiple unit conveyors, indicated at 25, 26 and 27, resepctively, for feeding loaves of bread, in sidewise relation, into combination slicer-wrapper machines, indicated generally at 30a and 30b, 31a and 31b, and 32a and 32b. It is to be understood that each of the combination slicer-wrapper machines are integrated machines that operate in timed relation to each other. The slicer-wrapper machines are arranged in a bank, disposed directly beneath a portion of the cooler 12, as seen in Figure 2 of the drawings, for efficient utilization of the floor space in the bakery.

The combination slicer-wrapper machines discharge the sliced and wrapped bread, in sidewise relation, upon conveyors, indicated at 33, 34 and 35, certain of which include inclined sections, merging into horizontal sections, disposed in vertically spaced apart tiered relationship, as seen in Figure 3 of the drawings, to insure maximum convenience and efficiency in accumulating the sliced and wrapped bread for purposes of transferring to delivery trucks or for placement on racks for temporary storage.

Extending transversely of the three parallel multiple unit conveyors 25, 26 and 27, is an auxiliary conveyor, indicated generally at 40, which is disposed below the respective, parallel, multiple unit conveyors. Said auxiliary conveyor is adapted for discharging loaves of bread onto a sorting table 41, from which said loaves, if in satisfactory condition, are removed and replaced upon either of the feeding conveyors 14 and 15. The purpose of the auxiliary conveyor is for conveniently receiving and transferring to the sorting table loaves of bread which are misaligned on the respective take-away conveyors 21, 22 and 23, as well as the loaves of bread which are deflected from the multiple conveyor units 25, 26 and 27, in the event that their corresponding combination slicer-wrapper machines become inoperative for any of a various number of causes, as will hereinafter be particularly pointed out.

As may be seen in the drawings, the various conveyor structures are made up of a multiplicity of separate units which for convenience and simplicity of control are driven either individually, or in groups of two or three adjacent units, by separate electrical motors. It will be noted that the feeding conveyors 14 and 15 each include, respectively, an arcuate section 14a and 15a, for changing the direction of feed of the loaves of bread on the respective conveyors, at approximately a 90° turn. Similarly, each of the take-away conveyors include, respectively, arcuate sections 21a, 22a and 23a, for again changing the path of travel of the loaves of bread so that they move in a direction substantially opposite to the outlet streams of the loaves of bread as they come from the cooler onto the feeding conveyors 14 and 15. Likewise, each of the conveyors 33, 34 and 35 (for receiving the sliced and wrapped bread from the combination slicer-wrapper units), include arcuate sections 33a, 34a and 35a for again changing the path of travel of the loaves of bread for feeding in a direction substantially opposite to the direction of the switch conveyor unit 18. These arcuate conveyor sections are all power driven units, as are the other units and sections of conveyors employed in the system, and these sections, as well as all other sections of conveyors (except as hereinafter specifically pointed out), are of the type formed of a multiplicity of transversely extending, spaced apart, rods 45, as seen in Figure 16 of the drawings, the ends of which rods are looped around preceding rods so as to form a flexible belt. The rods proper engage sprocket wheels 46, as seen in Figure 16 of the drawings, for positively driving said belts. These sprockets are arranged in pairs and fixedly mounted on transverse shafts, 47, carried on the supporting frames of each conveyor section or unit. A belt of this type is particularly suitable for embodiment in an arcuate section of power driven conveyors, wherein the spacing of the rods, at one edge, is less than at the opposite edge, as is well understood in the art.

In the conveyor system, as herein disclosed, it will be noted that the various conveyor sections or units are self contained units, having their own individual supporting frame structures, with the conveyor runs disposed at a proper horizontal level for convenient access, for manually removing bread therefrom or placement of bread thereon, in the event of an emergency condition which interferes with the normal, continuous feeding of the bread to the combination slicer-wrapper machines.

In the arrangement shown, the conveyor switch unit, indicated generally at 18, depending on the particular position of adjustment of the respective conveyors 18a and 18b, is adapted for continuously feeding loaves of bread onto any two of the three take-away conveyors 21, 22 and 23, which adjustment of said conveyors depend upon which of the combination slicer-wrapper machines is used as a stand-by or auxiliary machine, or depending upon which of the combination slicer-wrapper machines has become inoperative, for various reasons. The switch conveyor structure may be electrically connected in control circuits with the respective combination slicer-wrapper machines in a manner so that it will automatically become repositioned so as to discontinue feeding of bread to a certain take-away conveyor whose corresponding slicer-wrapper machine has become inoperative for any of a number of reasons, such as when the paper breaks, or when the supply of paper is exhausted, or when a slicing blade is broken, etc.

Referring now specifically to the switch conveyor unit 18, as may be seen in Figures 11 to 17 of the drawings, each of the conveyors 18a and 18b have their head-ends supported on a pair of upright stationary frames 50, in substantially horizontal alignment with the discharge ends of the feeding conveyors 14 and 15. Each of these conveyors include a transversely extending foot shaft 51, journaled at opposite end portions on the upright frames 50, and mounted on each shaft is a pair of spaced apart sprockets 46 for driving the wire conveyor belts 45 of the respective conveyors. Each of the conveyors include a supporting frame structure 53, pivotally mounted at one end on their respective shafts 51, so as to permit swinging of each of the entire conveyors in a vertical direction, about the axis of the respective shafts 51. At the discharge end of each of the conveyors 18a and 18b, the wire belt 45 is trained around a pair of spaced apart sprockets 46, mounted on a shaft 54, journaled on the opposite end of said frame 53.

Rigidly connected to the frame 53 of the upper conveyor 18a, and projecting rearwardly and upwardly therefrom, as clearly seen in Figures 11, 12 and 14 of the drawings, is a supporting bracket 57 on which is mounted an electric motor 58, driving speed reducing mechanism 59, which, through a chain indicated at 60, drives a gear 61, mounted on the outer end of the shaft 51 of the upper conveyor 18a, thus providing a separate motor drive for said conveyor. Rigidly connected to and projecting rearwardly and downwardly from the frames 53 of the lower conveyor 18b, is a supporting shelf 62 on which is mounted an electric motor 63 for driving a speed reducer 64, which, through the medium of a chain 65, drives a gear 66, mounted on the outer end of the shaft 51 of said lower conveyor 18b, thus providing a separate drive to said latter conveyor. The weight of the overhanging shelf structures, together with the motors and speed reducers, serve as counter-balances for each of the conveyors 18a and 18b for counter-balancing of the major portion of the overhanging weight of the respective conveyors 18a and 18b, beyond the axis of their corresponding shafts 51, so as to minimize the amount of power required for moving each of the respective conveyors in a swinging manner about the axis of their corresponding shafts 51.

The discharge ends of said conveyors 18a and 18b are guided for vertical movement between a pair of spaced apart upright frame members 70, and secured to the outer vertical edge of each of said members are a pair of vertically spaced apart angle clips 71 and 72 for limiting the vertical position of adjustment of the discharge end of the conveyor 18a. On the inner vertical edge of each of said members 70 are pairs of vertically spaced apart angle clips 73 and 74 for limiting the vertical movement of the discharge end of the conveyor 18b. Each of the frames 53, of the respective conveyor units, is provided with a transversely extending rod 76 for abutting against either of the angle clip stops for insuring proper positioning of the discharge ends of said conveyors 18a and 18b. As may be seen in Figure 13 of the drawings, when the conveyor 18a is positioned with its rod 76 abutting against the stops 72, the discharge end thereof is disposed in alignment with the head-end of the take-away conveyor 22, and when the lower conveyor 18b is positioned with its rod 76 abutting against the stops 74, the discharge end thereof is in registration with the take-away conveyor 23. When the conveyor 18a is disposed in the opposite position, with the rod 76 abutting against the stops 71, the discharge end thereof is disposed in registration with the head-end of the take-away conveyor 21, as seen in Figure 11, and when the lower conveyor 18b is adjusted in a position with the rod 76 abutting against the stops 73, the discharge end thereof is disposed in registration with the head-end of the take-away conveyor 22. It will therefore be apparent that the two conveyors 18a and 18b may properly assume any three positions of adjustment, such as seen in Figure 11 of the drawings, for feeding on to take-away conveyors 21 and 23, or, as seen in Figure 13 of the drawings, for feeding onto take-away conveyors 22 and 23, or, may assume a position for feeding onto the take-away conveyors 21 and 22.

The conveyor 18a of the switch structure unit may assume the position of adjustment, as seen in Figure 13 of the drawings, at which time its discharge end is in registration with take-away conveyor 22, and when it is desired that said conveyor 18a be adjusted to a position with its discharge end registering with the take-away conveyor 21, as seen in Figure 11 of the drawings, such adjustment is accomplished by an air control unit of a presently available commercial type, as indicated generally at 80, which, it is to be understood, contains an air operated ram, connected to an externally projecting rod 81, which is connected centrally to the bottom of a yoke or U-shaped frame 82. The upper ends of the upright legs of said yoke are pivotally connected at 83 to the sides of the frame 53 of said conveyor 18a.

It is also to be understood that the conveyor 18b may assume a position as seen in Figure 13 of the drawings, in registration with take-away conveyor 23, and is adapted to be moved to a position with its discharge end registering with the take-away conveyor 22, by means of an air controlled unit, indicated at 85, having a ram rod 86, connected to a yoke 87, the upper ends of the arms of which are pivotally connected at 88 to the sides of the frame 53 of said conveyor unit 18b.

The air control units 80 and 85 are operated by an electrical control apparatus (not shown) for controlling the admission of air under pressure for actuating the ram of each of these units either simultaneously or individually, and each of the air control units operates under constant pressure and serves to maintain the ram at an extended position, and when the ram is vented to atmosphere, the unbalanced weight of the conveyor, together with the spring pressure acting on the ram when vented to atmosphere, causes the conveyor to swing from its elevated position to its lower position of adjustment. It is to be understood that the air control units 80 and 85 are interconnected in a manner so that if one of the conveyors 18a or 18b is disposed with its discharge end in registration with the take-away conveyor 22, the other movable conveyor of the switch unit cannot be moved to that position of adjustment, namely, in registration with take-away conveyor 22, until the conveyor that occupied said position has been moved to its other position of adjustment. To insure satisfactory operation of the conveyors 18a and 18b so that the angle of inclination thereof is reduced to a practical minimum, at their various positions of adjustment, we prefer that the pivot axis, that is, the axis of the shaft 51 of the upper conveyor unit 18a, be located at a vertical height substantially midway between the head-ends of the take-away conveyors 21 and 22, and likewise the axis of the pivot shaft 51 of the lower conveyor 18b, is located substantially midway between the vertical height of the take-away conveyors 22 and 23.

To insure positive feeding of the loaves of bread from the respective conveyor units 18a and 18b onto the take-away conveyors, the movable end of their frames 53 are provided with a pair of forwardly extending, spaced apart brackets 90, in which is journaled the ends of a roller 92, positioned so as to bridge the gap between the wire belts 45 of the switch conveyor units 18a and 18b with respect to said belts of the take-away conveyors. These rollers 92 each have a sprocket 93 at one end thereof, driven by chain 94 by a sprocket 95 mounted on the extension of the shaft 54, at the discharge end of each of the conveyors 18a and 18b, as seen in Figures 16 and 17 of the drawings. The periphery of the main portion of the body of the roller 92 is preferably knurled or grooved, and since this roller is power driven it insures force feeding of the loaves of bread as they discharge from the belts of the conveyors 18a and 18b onto the belts of the take-away conveyors.

As may be seen in Figures 12 and 13, power driven feed rollers 92 are also positioned at the discharge ends of the feeding conveyors 14 and 15, and which likewise are power driven for insuring positive feeding of loaves of bread from the feeding conveyors onto the switch conveyors 18a and 18b. It is to be understood that, if desired, suitable power driven feed rollers may be provided between any two sections or units of conveyors for making certain of positively feeding the bread in proper position from one conveyor section or unit to another.

As above stated, the conveyor units 18a and 18b may be operated automatically through an electrical control circuit interconnected with the combination slicer-wrapper machines and the feeding conveyors or said switch conveyors may be manually controlled. In either event, it is to be understood that the electrical control for moving either of the conveyors 18a and 18b is connected in an interlocking electrical circuit with the tray conveyor of the cooler, so that readjustment of either of the switch conveyors 18a or 18b can only take place when there is no bread on the switch conveyors. This arrangement is possible due to the time delay between feeding of the rows of bread from the trays of the cooler onto the feeding conveyors. For example, one of the combination slicer-wrapper machines may be actuated under the control of an electrical circuit for causing switching of either or both of the switch conveyors 18a and 18b, but readjustment of the switch conveyors cannot take place until the trays of the cooler are in proper relation for permitting the switch conveyors to become readjusted. Accordingly, it will be recognized that under such conditions there will be times when the slicer-wrapper machine has become inoperative or is about to become inoperative and has caused adjustment of electrical control circuits, and under which condition a quantity of bread may still be fed to the slicer-wrapper machines, even though said machines are not operating. Such bread would normally accumulate at the slicer-wrapper machine that has become inoperative and would remain there until such machine is again operating, at which time the bread would be further processed in a normal manner. To prevent an excess accumulation of bread adjacent the slicer-wrapper machine, we employ a shuttle or deflector arm for causing bread being fed in the general direction of an in operative slicer-wrapper machine to be transferred from the main conveyor system, as will hereinafter be described. In the event that a slicer-wrapper machine becomes inoperative, bread will continue to be fed onto the take-away conveyor leading up to said machine, until the switch conveyor becomes readjusted for causing the flow of bread to be directed onto another take-away conveyor, for feeding to a different sliver-wrapper machine.

Between each of the arcuate conveyor sections 21a, 22a and 23a of the multiple take-away conveyor units and the respective slicer-wrapper machines 30a, 31a and 32a, are two conveyor sections, indicated generally at 100 and 101, which are disposed in aligned relation for feeding the bread from the arcuate conveyor sections directly to the slicer-wrapper machines. In order to insure that the loaves of bread, that are being discharged from the arcuate sections onto the conveyors 100, are in proper transverse position, moving in sidewise direction, there are provided guide members 102 and 103 at the discharge end portion of each of the arcuate conveyor sections, as clearly seen in Figure 18 of the drawings.

Each of the conveyor sections 100 comprises head and tail pulleys 105 and 106, around which are trained a pair of relatively narrow, transversely spaced apart belts 107. The spacing of the belts is such that loaves of bread that are misaligned and are moving in substantially endwise direction, are discharged downwardly either between the pair of belts 107, or between one of said belts and the side frame structure of the conveyor. Mounted beneath the head-end of the conveyor section 100 is a chute 108, the lower terminal portion of which registers with the side of the auxiliary conveyor 40 so that loaves of bread thus falling through the conveyor section 100 are immediately picked up by the auxiliary conveyor 40 and conveyed to the sorting table 41. Because the slicer-wrapper machines are constructed and arranged for receiving loaves of bread traveling in sidewise direction, it is important that misaligned loaves—and especially loaves that are traveling in generally endwise direction—be removed from feeding lines before arriving at the slicer-wrapper machines.

The conveyor section 101 includes head and tail pulleys 110 and 111 around which is trained a belt 112. It is to be noted that the discharge end of the conveyor 101 is positioned in adjoining relation to the slicer-wrapper machine for feeding of the loaves of bread in sidewise direction to said machine.

As above mentioned, the slicer-wrapper machines may become inoperative for numerous reasons. However, bread may still remain on the operating take-away conveyor leading up to such machine, and which bread is continuously fed toward the machine. To avoid piling up and possible damage to the loaves of bread during the interval, prior to operation of the switch conveyor 18, for discontinuing the feeding of bread to the particular take-away conveyor which supplied bread to said respective machines, we provide a shunt mechanism adjacent each of said conveyor sections 101. Said shunt mechanism comprises a deflector bar or arm 114, normally disposed at one side of the conveyor belt 112, said deflector bar being pivotally mounted at 115, on a suitable bracket carried on the side frame of the conveyor section. Connected to said bar 114, at one side of the pivot mounting, is a rod 116, connected to a ram of an air controlled unit, indicated generally at 117. It is to be understood that the air controlled unit 117 is actuated by compressed air, through an electrical control system, interconnected with the electrical circuits for controlling the respective slicer-wrapper machine, so that in the event that the respective slicer-wrapper machine becomes inoperative for any reason, the air controlled unit 117 is actuated to cause movement of the deflector bar 114 from one side of the conveyor section 101, as seen in Figure 4, to the position seen in Figure 18, extending obliquely across the conveyor belt 112 at an angle approximating 45°. It is to be understood that when the air pressure to the air control unit 117 is discontinued, said unit becomes vented to atmosphere, and under influence of a spring within the air control unit the ram is returned to its normal position, causing the deflector bar to be moved to its normal position, parallel and adjacent the side edge of the conveyor belt 112. It is to be understood that the ram of the air controlled unit 117, when at either limit of its movement, within its housing, serves as the stop means for limiting the position of the deflector arm at either its operative or inoperative position.

At the side of the conveyor belt 112, opposite to the air controlled unit 117, there is provided an arcuate chute 120, the lower terminal portion of which registers with the side edge of the auxiliary conveyor 40, as seen in Figures 18 and 20 of the drawings, so that the loaves of bread that are shunted off of the conveyor belt 112 are caused to discharge freely onto the auxiliary conveyor 40 for depositing onto the sorting table 41, from which the loaves of bread are then subsequently manually removed and placed upon either of the feeding conveyors 14 and 15 so that they become fed to take-away conveyors that are supplying bread to operating slicer-wrapper machines.

It is to be noted that the belt conveyor 101 is driven by a motor 122 through a chain drive 123, to the head pulley 110, and the conveyor section 101 drives the conveyor section 100 by chain drive, as indicated at 125, between the tail pulley 111 and the head pulley 105 of the conveyor section 100. It will also be noted that the conveyor section 100 drives the adjacent arcuate conveyor section, such as indicated at 23a in Figure 18 of the drawings, through a chain drive 127 interconnecting the tail pulley 106 of said conveyor section 100 and the sprocket shaft at the discharge end of said arcuate conveyor section.

In order to insure a compact arrangement, it will be noted that in Figure 4 of the drawings, the chute 120 and the deflector bar 114 are located in opposite relation on the end conveyor section 25, as compared to the arrangement on the end of conveyor sections 26 and 27, immediately adjacent the respective slicer-wrapper machines.

It will now be apparent that by virtue of the present invention it may be possible to mechanically handle bread directly from the baking oven and convey it to a suitable discharge point in wrapped and sliced condition, preparatory to loading onto trucks or for placement on racks for temporary storage, in a relatively efficient manner, effecting substantial savings in manual handling as well as in floor area required in the bakery.

Although we have herein shown and described a preferred embodiment of our invention, manifestly it is capable of modification and rearrangement of parts without departing from the spirit and scope thereof. We do not, therefore, wish to be understood as limiting this invention to the precise embodiment herein disclosed, except as we may be so limited by the appended claims.

We claim as our invention:

1. In a bakery conveyor system comprising two feeding conveyors having their discharge ends disposed in vertically spaced apart relation, and three take-away conveyors having head ends disposed in vertically spaced apart relation for delivering bread to three separate, combination slicer-wrapper machines; the improvement comprising a switch conveyor unit interposed between the feed conveyors and take-away conveyors, said unit comprising a frame, two vertically spaced apart conveyors carried on the frame and pivotally mounted respectively, adjacent the discharge ends of said feeding conveyors, and the opposite ends being vertically swingable to register with the head end of either of two of said three take-away conveyors, means for moving the upper conveyor of the switch unit from a position wherein its discharge end registers with the head end of either of the two uppermost take-away conveyors to a position wherein it will register with the other of said two uppermost take-away conveyors, depending upon which one of two of said slicer-wrapper machines is selected for operation, and means for moving the lower conveyor of the switch unit from a position wherein its discharge end registers with the head end of either of the two lowermost take-away conveyors to a position wherein it will register with the other of said two lowermost take-away conveyors, depending upon which one of the remaining two slicer-wrapper machines is selected for operation.

2. In a bakery conveyor system comprising two feeding conveyors having their discharge ends disposed in vertically spaced apart relation, and three take-away conveyors having head ends disposed in vertically spaced apart relation for delivering bread to three separate, combination slicer-wrapper machines; the improvement comprising a switch conveyor unit interposed between the feed conveyors and take-away conveyors, said unit comprising a frame, two vertically spaced apart conveyors movably mounted on the frame and having corresponding ends positioned adjacent the discharge ends of said feeding conveyors and each having its opposite end registrable with the head end of either of two of said three take-away conveyors, means for moving the upper conveyor of the switch unit from a position wherein its discharge end registers with the head end of either of the two uppermost take-away conveyors to a position wherein it will register with the other of said two uppermost take-away conveyors, depending upon which one of two of said slicer-wrapper machines is selected for operation, and means for moving the lower conveyor of the switch unit from a position wherein its discharge end registers with the head end of either of the two lowermost take-away conveyors to a position wherein it will register with the other of said two lowermost take-away conveyors, depending upon which one of the remaining two slicer-wrapper machines is selected for operation.

3. In a bakery conveyor system comprising two feeding conveyors having their discharge ends disposed in vertically spaced apart relation, and three take-away conveyors having head ends disposed in vertically spaced apart relation for delivering bread to three separate, combination slicer-wrapper machines; the improvement comprising a switch conveyor unit interposed between the feed conveyors and take-away conveyors, said unit comprising a frame, two vertically spaced apart conveyors movably mounted on the frame and having corresponding ends positioned adjacent the discharge ends of said feeding conveyors and each having its opposite end registrable with the head end of either of two of said three take-away conveyors, means for moving the upper conveyor of the switch unit from a position wherein its discharge end registers with the head end of either of the two uppermost take-away conveyors to a position wherein it will register with the other of said two uppermost take-away conveyors, depending upon which one of two of said slicer-wrapper machines is selected for operation, means for moving the lower conveyor of the switch unit from a position wherein its discharge end registers with the head end of either of the two lowermost take-away conveyors to a position wherein it will register with the other of said two lowermost take-away conveyors, depending upon which one of the remaining two slicer-wrapper machines is selected for operation, and stop means on the frame for limiting the movement of the swingable end of each conveyor of said switch unit at either of its two respective positions of adjustment.

4. In a bakery conveyor system comprising two feeding conveyors having their discharge ends disposed in vertically space apart relation, and three take-away conveyors having head ends disposed in vertically spaced apart relation for delivering bread to three separate, combination slicer-wrapper machines; the improvement comprising a switch conveyor unit interposed between the feed conveyors and take-away conveyors, said unit comprising a frame, two vertically spaced apart conveyors carried on the frame and pivotally mounted respectively, adjacent the discharge ends of said feeding conveyor, and the opposite ends being vertically swingable to register with the head end of either of two of said three take-away conveyors, the pivot axis of each of said switch conveyors being located in a horizontal plane between the said two take-away conveyors, means for moving the upper conveyor of the switch unit from a position wherein its discharge end registers with the head end of either of the two uppermost take-away conveyors to a position wherein it will register with the other of said two uppermost take-away conveyors, depending upon which one of two of said slicer-wrapper machines is selected for operation, and means for moving the lower conveyor of the switch unit from a position wherein its discharge end registers with the head end of either of the two lowermost take-away conveyors to a position wherein it will register with the other of said two lowermost take-away conveyors, depending upon which one of the remaining two slicer-wrapper machines is selected for operation.

5. In a bakery conveyor system comprising two feeding conveyors having their discharge ends disposed in vertically spaced apart relation, and three take-away conveyors having head ends disposed in vertically spaced apart relation for delivering bread to three separate, combination slicer-wrapper machines; the improvement comprising a switch conveyor unit interposed between the feed conveyors and take-away conveyors, said unit comprising a frame, two vertically spaced apart conveyors movably mounted on the frame and having corresponding ends positioned adjacent the discharge ends of said feeding conveyors and each having its opposite end registrable with the head end of either of two of said three take-away conveyors, means for moving the upper conveyor of the switch unit from a position wherein its discharge end registers with the head end of either of the two uppermost take-away conveyors to a position wherein it will register with the other of said two uppermost take-away conveyors, depending upon which one of two of said slicer-wrapper machines is selected for operation, and means for moving the lower conveyor of the switch unit from a position wherein its discharge end registers with the head end of either of the two lowermost take-away conveyors to a position wherein it will register with the other of said two lowermost take-away conveyors, depending upon which one of the remaining two slicer-wrapper machines is selected for operation, each of said moving means comprising an air control unit mounted on the frame and a yoke pivotally connected to opposite sides of the respective conveyor of the switch unit.

References Cited in the file of this patent

UNITED STATES PATENTS

| | | |
|---|---|---|
| 1,000,736 | Koerner | Aug. 15, 1911 |
| 1,413,741 | France | Apr. 25, 1922 |
| 1,748,010 | Johnson | Dec. 9, 1930 |
| 1,845,562 | Sandberg | Feb. 16, 1932 |
| 1,913,533 | Brunner | June 13, 1933 |
| 1,929,204 | Jeffrey et al. | Oct. 3, 1933 |
| 1,949,281 | Moore | Feb. 27, 1934 |
| 2,346,549 | Belada | Apr. 11, 1944 |
| 2,476,371 | Haumann | July 19, 1949 |
| 2,536,756 | Lopez | Jan. 2, 1951 |
| 2,541,610 | Rayburn et al. | Feb. 13, 1951 |
| 2,569,011 | Laprise | Sept. 25, 1951 |
| 2,695,716 | Graham | Nov. 30, 1954 |